US006186383B1

United States Patent
Kobdish

(10) Patent No.: US 6,186,383 B1
(45) Date of Patent: Feb. 13, 2001

(54) DEVICE FOR MOUNTING FLASHLIGHTS TO BICYCLES

(76) Inventor: Robert P. Kobdish, 7301 Hooper Ave., Bakersfield, CA (US) 93308

(*) Notice: Under 35 U.S.C. 154(b), the term of this patent shall be extended for 0 days.

(21) Appl. No.: 09/489,568

(22) Filed: Jan. 21, 2000

(51) Int. Cl.⁷ .................. B62J 6/00; B62J 7/06
(52) U.S. Cl. .............. 224/420; 224/448; 248/214; 248/229.13
(58) Field of Search ............... 224/420, 424, 224/425, 427, 448; 248/214, 229.13

(56) References Cited

U.S. PATENT DOCUMENTS

| | | |
|---|---|---|
| D. 353,986 | 1/1995 | Maglica . |
| 1,222,458 * | 4/1917 | Peterson ................. 224/420 |
| 1,413,530 * | 4/1922 | Harned ................... 224/420 |
| 1,735,212 * | 11/1929 | Pawsat .................. 224/420 |
| 4,170,337 * | 10/1979 | Davis ................... 224/420 |
| 4,390,927 | 6/1983 | Von Feldt . |
| 4,541,555 | 9/1985 | Miree . |
| 4,697,725 | 10/1987 | Miree . |
| 5,115,952 * | 5/1992 | Jenkins ................. 224/425 |
| 5,144,546 | 9/1992 | Burdi . |
| 5,167,353 * | 12/1992 | Hughes ................. 224/425 |
| 5,181,774 | 1/1993 | Lane . |
| 5,299,720 * | 4/1994 | Koch, III .............. 224/425 |
| 5,564,817 * | 10/1996 | Palmer ............... 248/231.21 |
| 5,653,356 * | 8/1997 | Lee ..................... 224/448 |
| 5,662,255 * | 9/1997 | Lu ..................... 224/451 |
| 5,984,248 * | 11/1999 | Evans et al. ........ 248/229.13 |
| 6,029,874 * | 2/2000 | Meggitt ............... 224/412 |
| 6,062,447 * | 5/2000 | Longley ............... 224/222 |

* cited by examiner

Primary Examiner—Stephen P. Garbe

(57) ABSTRACT

A device for mounting flashlights to bicycles for releasably mounting a flashlight to the handlebar of a bicycle. The device for mounting flashlights to bicycles includes a first and second support mount for removably mounting a flashlight to the handlebar of a bicycle. The handlebar of the bicycle has a cylindrical cross-sectional shape in a plane transverse to its length. The device includes a first support mount for mounting to a handlebar and a second support mount for holding a flashlight. The first support mount has a first portion and a second portion. The first and the second portions each have an inside surface, an outer surface, a first end wall and a second end wall. The inner surfaces are concave. The first end of the first portion is hingedly coupled to the first end of the second portion. A first bore is in the second end of the second portion. A second bore is in the second end of the first portion of the support mount. The second bore extends from the second end of the first portion through the outer surface of the first portion. A screw releasably couples the first portion to the second portion. The second support mount is fixedly coupled to the outer surface of the first portion of the first support mount. The second support mount is substantially annular in shape. The second support mount has a gap therein.

5 Claims, 3 Drawing Sheets

DEVICE FOR MOUNTING FLASHLIGHTS TO BICYCLES

BACKGROUND OF THE INVENTION

1. Field of the Invention

The present invention relates to mountings for flashlights and more particularly pertains to a new device for mounting flashlights to bicycles for releasably mounting a flashlight to the handlebar of a bicycle.

2. Description of the Prior Art

The use of mountings for flashlights is known in the prior art. More specifically, mountings for flashlights heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,390,927; U.S. Pat. No. 4,697,725; U.S. Pat. No. 4,541,555; U.S. Pat. No. 5,181,774; U.S. Pat. No. 5,144,546; and U.S. Pat. Des. No. 353,986.

While these devices fulfill their respective, particular objectives and requirements, the aforementioned patents do not disclose a new device for mounting flashlights to bicycles. The inventive device includes a first and second support mount for removably mounting a flashlight to the handlebar of a bicycle. The handlebar of the bicycle has a cylindrical cross-sectional shape in a plane transverse to its length. The device includes a first support mount for mounting to a handlebar and a second support mount for holding a flashlight. The first support mount has a first portion and a second portion. The first and the second portions each have an inside surface, an outer surface, a first end wall and a second end wall. The inner surfaces are concave. The first end of the first portion is hingedly coupled to the first end of the second portion. A first bore is in the second end of the second portion. A second bore is in the second end of the first portion of the support mount. The second bore extends from the second end of the first portion through the outer surface of the first portion. A screw releasably couples the first portion to the second portion. The second support mount is fixedly coupled to the outer surface of the first portion of the first support mount. The second support mount is substantially annular in shape. The second support mount has a gap therein.

In these respects, the device for mounting flashlights to bicycles according to the present invention substantially departs from the conventional concepts and designs of the prior art, and in so doing provides an apparatus primarily developed for the purpose of releasably mounting a flashlight to the handlebar of a bicycle.

SUMMARY OF THE INVENTION

In view of the foregoing disadvantages inherent in the known types of mountings for flashlights now present in the prior art, the present invention provides a new device for mounting flashlights to bicycles construction wherein the same can be utilized for releasably mounting a flashlight to the handlebar of a bicycle.

The general purpose of the present invention, which will be described subsequently in greater detail, is to provide a new device for mounting flashlights to bicycles apparatus and method which has many of the advantages of the mountings for flashlights mentioned heretofore and many novel features that result in a new device for mounting flashlights to bicycles which is not anticipated, rendered obvious, suggested, or even implied by any of the prior art mountings for flashlights, either alone or in any combination thereof.

To attain this, the present invention generally comprises a first and second support mount for removably mounting a flashlight to the handlebar of a bicycle. The handlebar of the bicycle has a cylindrical cross-sectional shape in a plane transverse to its length. The device includes a first support mount for mounting to a handlebar and a second support mount for holding a flashlight. The first support mount has a first portion and a second portion. The first and the second portions each have an inside surface, an outer surface, a first end wall and a second end wall. The inner surfaces are concave. The first end of the first portion is hingedly coupled to the first end of the second portion. A first bore is in the second end of the second portion. A second bore is in the second end of the first portion of the support mount. The second bore extends from the second end of the first portion through the outer surface of the first portion. A screw releasably couples the first portion to the second portion. The second support mount is fixedly coupled to the outer surface of the first portion of the first support mount. The second support mount is substantially annular in shape. The second support mount has a gap therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new device for mounting flashlights to bicycles apparatus and method which has many of the advantages of the mountings for flashlights mentioned heretofore and many novel features that result in a new device for mounting flashlights to bicycles which is not anticipated, rendered obvious, suggested, or even implied by any of the prior art mountings for flashlights, either alone or in any combination thereof.

It is another object of the present invention to provide a new device for mounting flashlights to bicycles which may be easily and efficiently manufactured and marketed.

It is a further object of the present invention to provide a new device for mounting flashlights to bicycles which is of a durable and reliable construction.

An even further object of the present invention is to provide a new device for mounting flashlights to bicycles which is susceptible of a low cost of manufacture with regard to both materials and labor, and which accordingly is then susceptible of low prices of sale to the consuming public, thereby making such device for mounting flashlights to bicycles economically available to the buying public.

Still yet another object of the present invention is to provide a new device for mounting flashlights to bicycles which provides in the apparatuses and methods of the prior art some of the advantages thereof, while simultaneously overcoming some of the disadvantages normally associated therewith.

Still another object of the present invention is to provide a new device for mounting flashlights to bicycles for releasably mounting a flashlight to the handlebar of a bicycle.

Yet another object of the present invention is to provide a new device for mounting flashlights to bicycles which includes a first and second support mount for removably mounting a flashlight to the handlebar of a bicycle. The handlebar of the bicycle has a cylindrical cross-sectional shape in a plane transverse to its length. The device includes a first support mount for mounting to a handlebar and a second support mount for holding a flashlight. The first support mount has a first portion and a second portion. The first and the second portions each have an inside surface, an outer surface, a first end wall and a second end wall. The inner surfaces are concave. The first end of the first portion is hingedly coupled to the first end of the second portion. A first bore is in the second end of the second portion. A second bore is in the second end of the first portion of the support mount. The second bore extends from the second end of the first portion through the outer surface of the first portion. A screw releasably couples the first portion to the second portion. The second support mount is fixedly coupled to the outer surface of the first portion of the first support mount. The second support mount is substantially annular in shape. The second support mount has a gap therein.

Still yet another object of the present invention is to provide a new device for mounting flashlights to bicycles that tightly grips the handlebar of a bicycle and contains ridges to prevent slipping of the mounting on the handlebar.

Even still another object of the present invention is to provide a new device for mounting flashlights to bicycles that has a mounting formed from elastomeric material such that different sized flashlights may be mounted to the bicycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
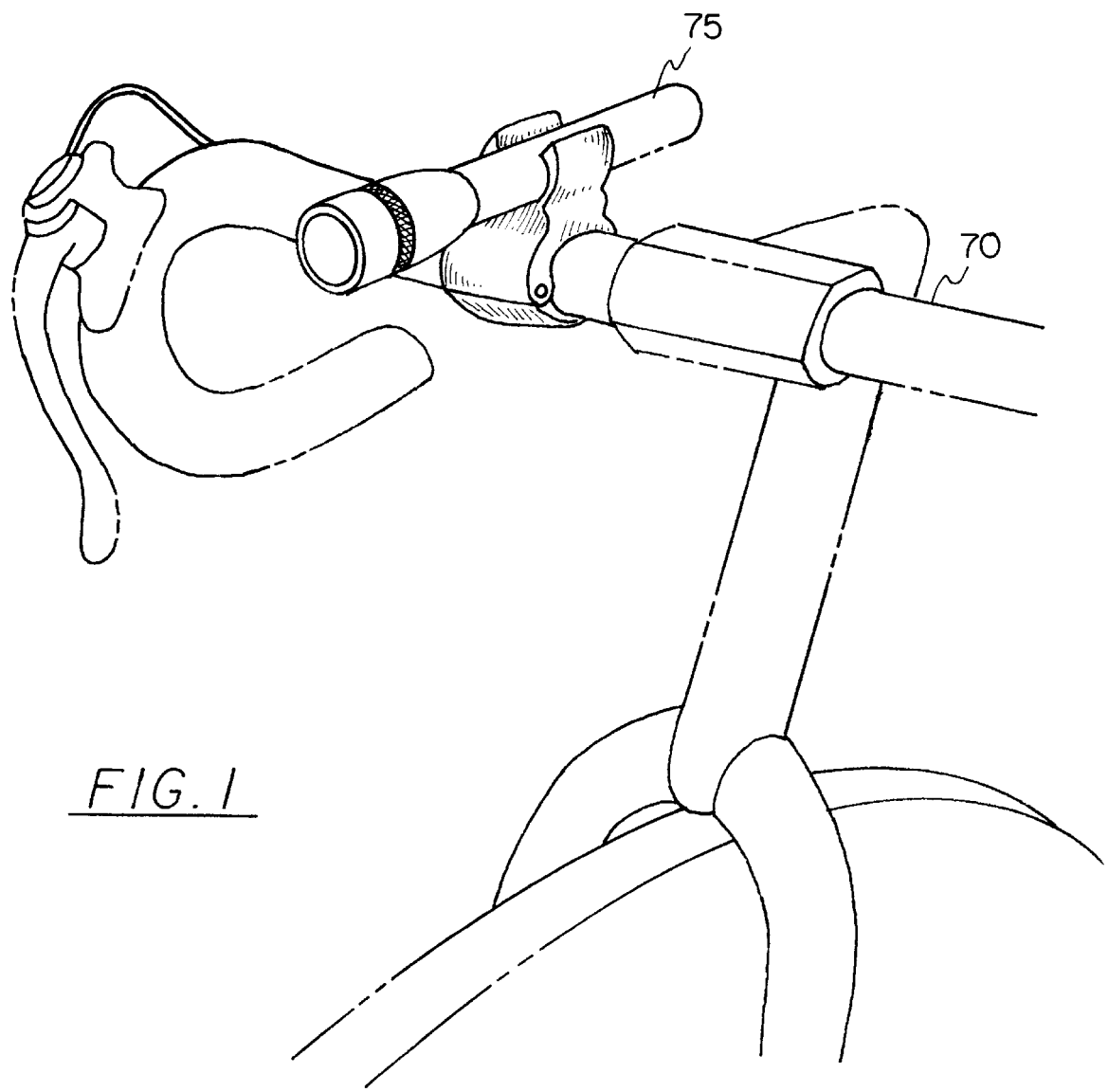
FIG. 1 is a schematic perspective view of a new device for mounting flashlights to bicycles according to the present invention.
Figure 2:
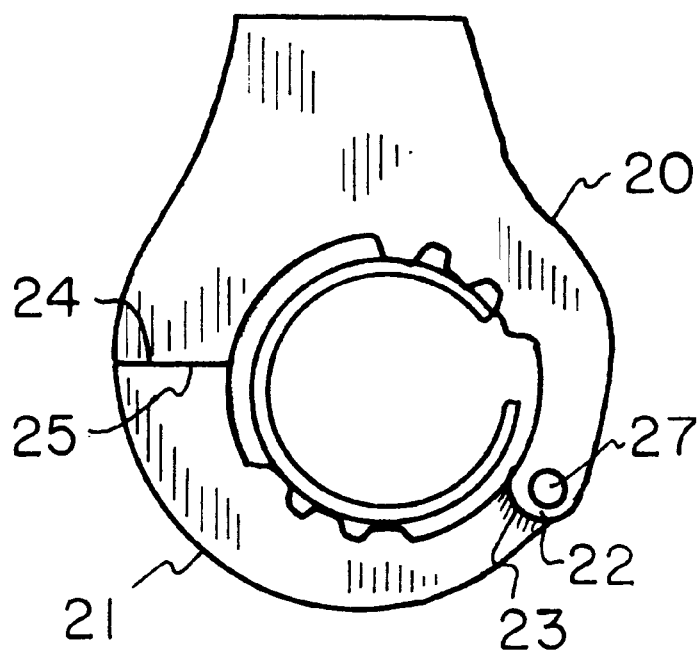
FIG. 2 is a schematic side view of the present invention.
Figure 3:
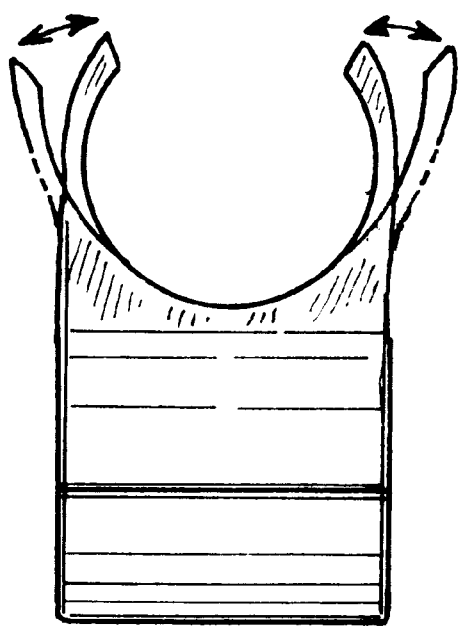
FIG. 3 is a schematic adjacent side view of the present invention.
Figure 4:
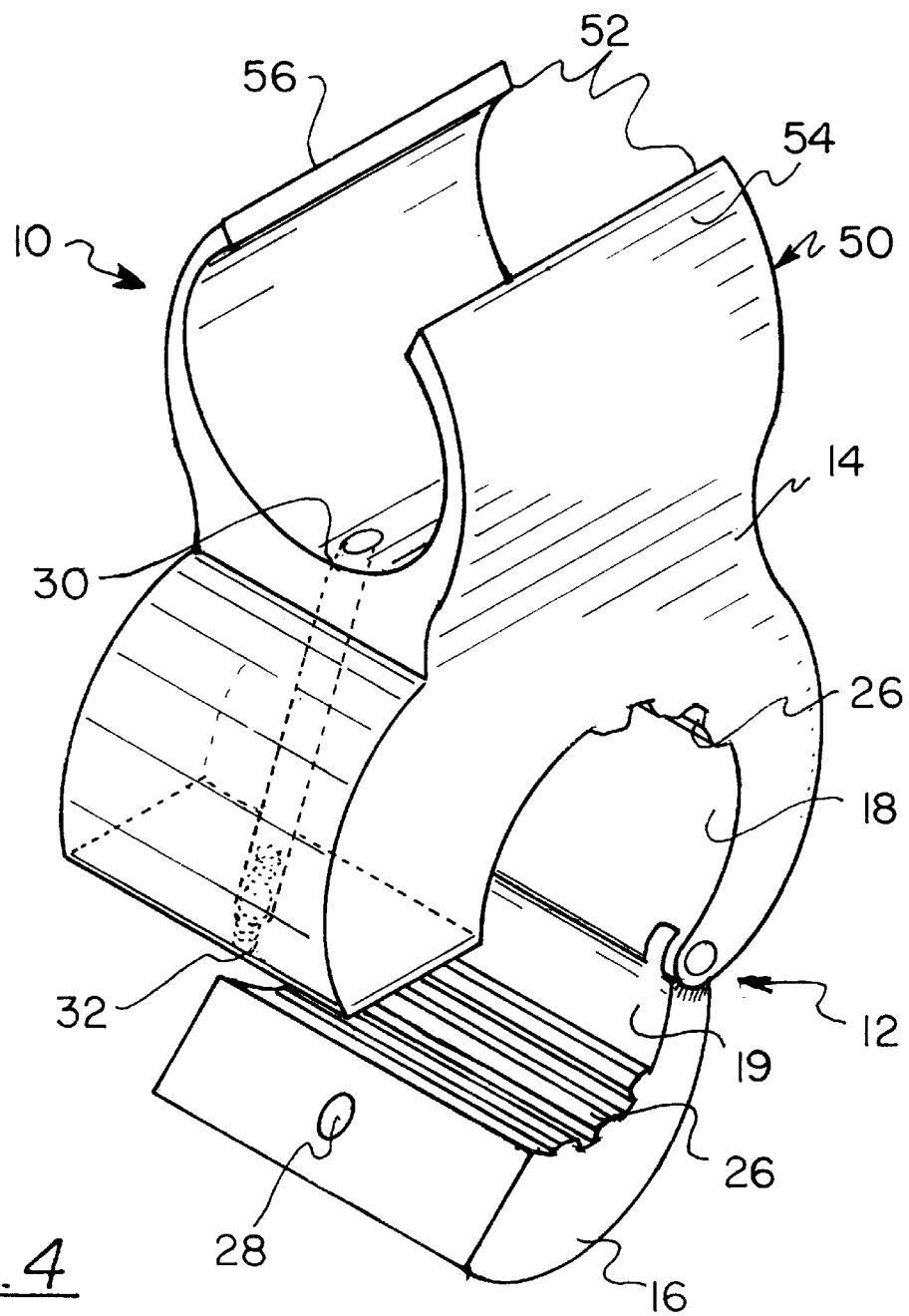
FIG. 4 is a schematic perspective view of the present invention.

With reference now to the drawings, and in particular to FIGS. 1 through 4 thereof, a new device for mounting flashlights to bicycles embodying the principles and concepts of the present invention and generally designated by the reference numeral 10 will be described.

As best illustrated in FIGS. 1 through 4, the device for mounting flashlights to bicycles 10 generally comprises a first support mount 12 for mounting to the handlebar 70 and a second support 50 for mounted a flashlight to the first support mount.

The first support mount 12 comprises a first portion 14 and a second portion 16. The first 14 and the second 16 portions each have an inside surface 18, 19 an outer surface 20, 21 a first end wall 22, 23 and a second end wall 24, 25. Each of the portions is substantially annular in shape and each of the inner surfaces 18, 19 is concave and each of the outer surfaces 20, 21 is convex. The first end 22 of the first portion 14 is hingedly coupled to the first end 23 of the second portion 16 by a hinge 27, wherein the first portion 14 moves between an open and a closed position with respect to the second portion 16. The closed position is defined by the second end 24 of the first portion 14 being adjacent to the second end 25 of the second portion 16. The inner surfaces 18, 19 of the first and second portions have ridges 26 formed thereon. The ridges assist in gripping the handlebar 70 of the bicycle.

A first bore 28 is in the second end 25 of the second portion 16. An inner surface of the first bore 28 is threaded.

A second bore 30 is in the second end 24 of the first portion 14 of the first support mount. The second bore extends from the second end 24 of the first portion 14 through the outer surface 20 of the first portion 14.

A screw 32 releasably couples the first portion 14 to the second portion 16. The screw is placed in second bore 30 and screwed into the first bore 28.

A second support mount 50 holds the flashlight 75. The second support mount 50 is fixedly coupled to the outer surface 20 of the first portion 14 of the first support mount 12. The second support mount 50 is substantially annular in shape. Preferably, an axis of the second support mount is oriented generally perpendicular to an axis of the first support mount 12. The second support mount 50 has a gap 52 therein. The gap 52 is between spaced ends for forming flexible fingers 54, 56 for gripping a substantially cylindrical flashlight body.

Preferably, the first 12 and second 50 support mounts are formed from elastomeric material such as natural or synthetic rubber, however plastic may be used as well.

In use, the first 14 and second portions 16 are wrapped about the handlebar 70. The screw 32 is inserted in the first 28 and second bores 30 to hold the first support mount 12 in place. The body of a flashlight 75 is placed between the spaced ends so the fingers 54, 56 of the second support mount hold the flashlight 75 in place.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for removably mounting a flashlight to the handlebar of a bicycle, the handlebar of the bicycle having a cylindrical cross-sectional shape in a plane transverse to its length, said device comprising:

a first support mount for mounting to said handlebar, said first support mount comprising:
  a first portion and a second portion, said first and said second portions each having an inside surface and an outer surface, a first end wall and a second end wall, wherein each of said inner surfaces are concave, said first end of said first portion being hingedly coupled to said first end of said second portion;
  a first bore, said first bore being in said second end of said second portion, an inner surface of said first bore being threaded;
  a second bore being in said second end of said first portion of said support mount, said second bore extending from said second end of said first portion through said outer surface of said first portion;
  a screw for releasably coupling said first portion to said second portion;
a second support mount for holding said flashlight, said second support mount being fixedly coupled to said outer surface of said first portion of said first support mount, said second support mount being substantially annular in shape; said second support mount having a gap therein.

2. The device for removably mounting a flashlight to the handlebar of a bicycle as in claim 1, said first support mount comprises:

each of said portions being substantially annular in shape, wherein said first portion moves between an open and a closed position with respect to said second portion, wherein said closed position is defined by said second end of said first portion being adjacent to said second end of said second portion, said inner surfaces of said first and second portions having ridges formed thereon.

3. The device for removably mounting a flashlight to the handlebar of a bicycle as in claim 1, said second support comprising:

said second support mount being substantially annular in shape, an axis of said second support mount being oriented generally perpendicular to an axis of said first support mount, said gap being between spaced ends for forming flexible fingers for gripping a substantially cylindrical flashlight body.

4. The device for removably mounting a flashlight to the handlebar of a bicycle as in claim 1, wherein said first and second support mounts are formed from elastomeric material.

5. A device for removably mounting a flashlight to the handlebar of a bicycle, the handlebar of the bicycle having a cylindrical cross-sectional shape in a plane transverse to its length, said device comprising:

a first support mount for mounting to said handlebar, said first support mount comprising:
  a first portion and a second portion, said first and said second portions each having an inside surface and an outer surface, a first end wall and a second end wall, each of said portions being substantially annular in shape, wherein each of said inner surfaces are concave and each of said outer surfaces are convex, said first end of said first portion being hingedly coupled to said first end of said second portion, wherein said first portion moves between an open and a closed position with respect to said second portion, wherein said closed position is defined by said second end of said first portion being adjacent to said second end of said second portion, said inner surfaces of said first and second portions having ridges formed thereon;
  a first bore, said first bore being in said second end of said second portion, an inner surface of said first bore being threaded;
  a second bore being in said second end of said first portion of said support mount, said second bore extending from said second end of said first portion through said outer surface of said first portion;
  a screw for releasably coupling said first portion to said second portion, wherein said screw is placed in second bore and screwed into said first bore;
a second support mount for holding said flashlight, said second support mount being fixedly coupled to said outer surface of said first portion of said first support mount, said second support mount being substantially annular in shape, an axis of said second support mount being oriented generally perpendicular to an axis of said first support mount; said second support mount having a gap therein, said gap being between spaced ends for forming flexible fingers for gripping a substantially cylindrical flashlight body; and
wherein said first and second support mounts are formed from elastomeric material.

\* \* \* \* \*